(12) United States Patent
Vetter et al.

(10) Patent No.: US 8,100,723 B2
(45) Date of Patent: Jan. 24, 2012

(54) BATTERY CONTACT SPRINGS

(75) Inventors: Ingo Vetter, Karben (DE); Heiko Bornheimer, Wiesbaden (DE); Florian Baier, Frankfurt am Main (DE); Joachim Lepper, Usingen (DE); Joern Utsch, Bad Soden (DE)

(73) Assignee: Braun GmbH, Kronberg (DE)

( * ) Notice: Subject to any disclaimer, the term of this patent is extended or adjusted under 35 U.S.C. 154(b) by 0 days.

(21) Appl. No.: 13/004,906

(22) Filed: Jan. 12, 2011

(65) Prior Publication Data

US 2011/0183553 A1    Jul. 28, 2011

(30) Foreign Application Priority Data

Jan. 23, 2010   (EP) .................................... 10000671

(51) Int. Cl.
*H01R 33/00* (2006.01)
(52) U.S. Cl. ....................................... 439/627; 439/500
(58) Field of Classification Search .................. 439/500, 439/824, 627, 816; 429/100, 178, 96
See application file for complete search history.

(56) References Cited

U.S. PATENT DOCUMENTS

| | | | |
|---|---|---|---|
| 2,355,197 A * | 8/1944 | Anthony et al. ............... | 429/174 |
| 3,339,169 A * | 8/1967 | Freeland .......................... | 439/55 |
| 3,650,841 A * | 3/1972 | Brindley ......................... | 429/159 |
| 3,980,388 A * | 9/1976 | Nailor, III ...................... | 439/752 |
| 4,086,454 A * | 4/1978 | Bluhm ............................. | 200/60 |
| 4,678,728 A * | 7/1987 | Christopulos .................. | 429/121 |
| 4,724,189 A * | 2/1988 | Chase ............................... | 429/99 |
| 5,384,207 A * | 1/1995 | Ohtani ............................. | 429/9 |
| 5,874,181 A * | 2/1999 | Tam ................................. | 429/1 |
| 6,293,819 B1 * | 9/2001 | Wu ................................. | 439/500 |
| 7,152,854 B2 * | 12/2006 | Uchida ........................... | 267/178 |
| 7,229,327 B2 * | 6/2007 | Zhao et al. ..................... | 439/840 |
| 7,458,862 B2 * | 12/2008 | Zhao et al. ..................... | 439/840 |
| 2008/0166629 A1 * | 7/2008 | Shiau ............................. | 429/169 |

* cited by examiner

*Primary Examiner* — Briggitte R Hammond
(74) *Attorney, Agent, or Firm* — John P. Colbert

(57) ABSTRACT

A battery contact spring with a spring body manufactured as a flexible wire part is disclosed. The battery contact spring has a first contact head section for contacting a first battery; a second contact head section for contacting a second battery, and at least one first spiral spring section that extends between a spring foot area and the first contact head section and which flexibly supports the first contact head section. The spring body is designed in such a way that a coil end of the first spiral spring section opposite the spring foot area crosses over into the first contact head section and attached to this first head section is a connection bridge that crosses over into the second contact head section.

11 Claims, 1 Drawing Sheet

BATTERY CONTACT SPRINGS

CROSS REFERENCE TO RELATED APPLICATIONS

This application claims the benefit of European Patent Convention Application No. 10000671.7, filed Jan. 23, 2010, the substance of which is incorporated by reference in its entirety herein.

FIELD OF THE INVENTION

The present disclosure is directed to battery contact springs. More particularly, the present disclosure is directed to battery-operated small devices and battery-operated small devices with such battery contact springs.

BACKGROUND OF THE INVENTION

Battery contact springs of the aforementioned type are built into the battery compartment of, for example, battery-operated toothbrushes. Battery contact springs help produce an electrical connection between the contact zones on the battery and the switch on the device. Such battery contact springs are typically designed so that when a sufficient contact pressure is maintained, they also provide a length compensation effect to balance the length tolerances of the battery and the construction of the receptacle. Battery contact springs are typically made of a stainless steel spring substance, for example 1.4310 (X10CrNi18-8). This substance has proved itself in the past in terms of its resistance to corrosion and its spring properties. This substance can be made into wire or a flat material.

There, however, exists a need for a battery contact spring that can be made of an inexpensive and available raw material in an advantageous production manner, and which is characterized by an advantageous operating performance.

SUMMARY OF THE INVENTION

In one embodiment, a battery contact spring with a spring body manufactured as a flexible wire part is provided. The battery contact spring includes a first contact head section for contacting a first battery; a second contact head section for contacting a second battery, and at least one first spiral spring section that extends between a spring foot area and the first contact head section and which flexibly supports the first contact head section. The spring body is designed in such a way that a coil end of the first spiral spring section opposite the spring foot area crosses over into the first contact head section and attached to this first head section is a connection bridge that crosses over into the second contact head section.

In another embodiment, a battery contact spring with a spring body manufactured as a flexible wire part is provided. The battery contact spring includes a first contact head section for contacting a first battery; a second contact head section for contacting a second battery; a first spiral section that extends between a spring foot area and the first contact head section and which flexibly supports the first contact head section; and a second spiral spring section that extends between a spring foot area and the second contact head section and which flexibly supports the second contact head section. The first spiral spring section and the second spiral spring section are connected by means of a connection bridge attached to the first head section and the second head section.

These and other features, aspects and advantages of specific embodiments will become evident to those skilled in the art from a reading of the present disclosure.

BRIEF DESCRIPTION OF THE DRAWINGS

The embodiments set forth in the drawings are illustrative in nature and not intended to limit the invention defined by the claims. The following detailed description of the illustrative embodiments can be understood when read in conjunction with the following drawings, where like structure is indicated with like reference numerals and in which:

DETAILED DESCRIPTION OF THE INVENTION

Figure 1:
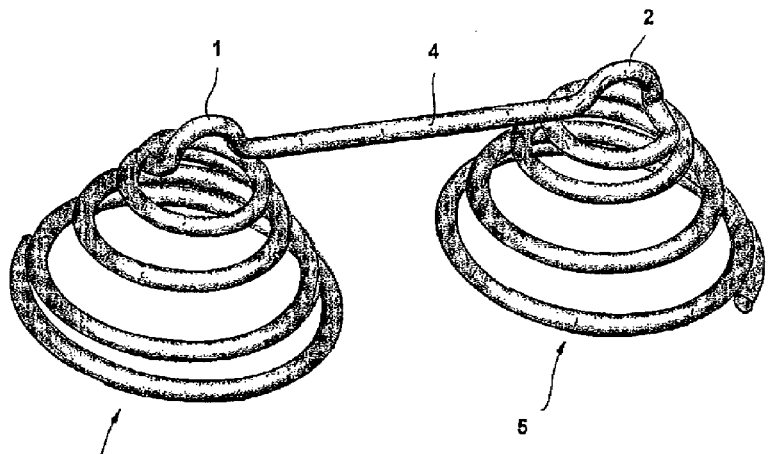
FIG. 1 is a perspective drawing of a battery contact spring according to one embodiment.

The following text sets forth a broad description of numerous different embodiments of the present disclosure. The description is to be construed as exemplary only and does not describe every possible embodiment since describing every possible embodiment would be impractical, if not impossible. It will be understood that any feature, characteristic, component, composition, ingredient, product, step or methodology described herein can be deleted, combined with or substituted for, in whole or part, any other feature, characteristic, component, composition, ingredient, product, step or methodology described herein. Numerous alternative embodiments could be implemented, using either current technology or technology developed after the filing date of this patent, which would still fall within the scope of the claims. All publications and patents cited herein are incorporated herein by reference.

According to the present disclosure, a battery contact spring is provided. In one embodiment, the battery contact spring has a spring body manufactured as a flexible wire part. The spring body has the following components: a first contact head section for contacting a first battery; a second contact head section for contacting a second battery; and a first spiral spring section that extends between a spring foot area and the first contact head section and which flexibly supports the first head section vis-à-vis the spring foot area. The spring body is designed in such a way that a coil end of the spiral spring section lying far from the spring foot area crosses over into the first contact head section and attached to this first head section is a connection bridge that crosses over into the second contact head section. This allows a battery contact spring to be produced in an advantageous manner, one that is characterized by favorable spring characteristics and significantly less inherent resistance.

The battery contact spring according to the present disclosure can be used in common battery receptacles without any need for major modification. The battery contact spring's mechanical properties are only slightly modified by the suggested action. Battery contact springs according the present disclosure can be made using conventional production systems. The battery contact spring's electrical properties are substantially better than those of conventional constructions. For example, one suggested battery contact spring, which typically requires approximately 25 cm of spring steel wire, now has only a wire length (which is effective for the current) that approximately corresponds to the center of the adjacent batteries, i.e., approximately to the battery diameter, which in the case of the same material with the same specific resistance produces an internal resistance, for example, of only approximately 30 milliohms (30 mΩ). This action provides a great advantage because cost-effective manufacturing processes using simple material having only optimized mechanical properties and ideal mechanical properties provides good electrical properties. This leads, in particular for devices with high power requirements, to a substantial improvement in the degree of efficiency. As a result, operating times can be prolonged by up to 20%.

In other words, the battery contact spring according to the present disclosure differs from known battery contact springs in that the contact head sections are connected only by a short wire bridge and each contact head section extends from the contact head sections to the respective foot end (i.e., to an end opposite the contact head section) in order to elastically (i.e., flexibly) support the built-in contact head sections. At the same time, the general direction of extension of the spiral spring sections is perpendicular to the direction of extension of the connection bridge between the contact head sections. In known battery contact springs, the ends of the connection bridge always cross over into spiral spring sections, on whose respective foot ends are arranged the contact head sections for contacting the batteries, so that a current flows through the entire length of the wire between the contact head sections; in the case of the battery contact spring described herein, in practice the current has to flow only through the short wire bridge.

According to one embodiment of the battery contact spring, the second contact head section is flexibly (i.e., elastically) supported by a second spiral spring section. The connection bridge is preferably made as an essentially straight bridge. It is also possible to design special geometries in the area of the connection bridge that, for example, secure the battery contact spring to a battery housing or which bypass a battery compartment wall. According to another embodiment, the first contact head section is carried out as a convex bow section that balloons (i.e., bulges out) toward the battery. This bow section is specifically aligned so that it is aligned directly in the direction of the connection bridge. According to an extended embodiment, the second contact head section is also carried out as a convex bow section that balloons (i.e., bulges out) toward the battery. Specifically, the connection bridge extends in a straight line between the two contact head sections.

The respective (first and/or second) spiral spring section can be carried out as a conical spiral spring coil. At the same time, the coil can be designed so that the first and/or second spiral spring section(s) can be compressed or "wound" relatively loosely. Typically, the respective spiral spring section is designed so that it has three, four or five spring coils. It is also possible to design the battery contact spring so that it comprises an additional connection bridge for connecting the coil ends of the spiral spring sections to the foot area electrically. This additional connection bridge can be manufactured directly by using corresponding ends of the wire material that forms the spiral spring sections. As a result, connecting the other spring wire material in parallel provides an even further reduced battery-coupling resistance.

In the area of the coil ends of the foot area, it is possible to design an anchoring structure (for example, in the form of a wire armature or a wire hoop) that helps anchor the battery contact spring to a battery receptacle or to a circuit board. Instead of contact head sections that are manufactured to be essentially the same, it is also possible to design them so as to be especially advantageous in terms of each allocated battery contact zone. In light of this fact, it is in particular possible to carry out one of the contact head sections as a distinct convex bow and the other contact section as a relatively flat spiral disk.

The present disclosure also relates to a battery-operated small device (that can be held in the hand), in particular an electric toothbrush or an electric shaver that is provided with a suggested battery contact spring.

FIG. 1 shows an exemplary embodiment of the battery contact spring. This battery contact spring is formed by a spring body manufactured as a flexible wire part. The spring body comprises a first contact head section 1 for contacting a first battery (not shown). The spring body also comprises a second contact head section for contacting a second battery (not shown). In one embodiment, the battery contact spring of FIG. 1 can be part, in particular, of a battery compartment of a small device, for example an electric toothbrush or an electric shaver. The spring body also comprises a first spiral spring section 3 that extends between a spring foot area (in this case the bottom coil of the first spiral spring section 3) and the first contact head section 1 which at the same time flexibly supports the first contact head section 1 vis-à-vis the spring foot area.

The spring body is designed in such a way that the coil end of the first spiral spring section 3 lying far from the spring foot area crosses over into the first contact head section 1, wherein a connection bridge 4 is attached to this first contact head section 1; the connection bridge crosses over into the second contact head section 2 and thus directly connects the two head sections 2.

In the embodiment shown of FIG. 1, the second contact head section 2 is supported by a second spiral spring section 5. The connection bridge 4 is carried out as an essentially straight bridge. In this embodiment, both the first contact head section 1 and the second contact head section 2 are carried out as convex bow sections that balloon (i.e., bulge out) toward the battery. The first and second spiral spring sections 3 and 5 are in each instance carried out as conical spiral spring coils and at the same time are designed so that each spiral spring section has a coil diameter that is larger in its foot area than in the area of the contact head sections. In the exemplary embodiment shown here, spiral spring sections 3 and 5 comprise a total of four spring coils, wherein the number of spring coils can be freely chosen and is determined by the available construction volume and the desired flexibility.

Figure 2:
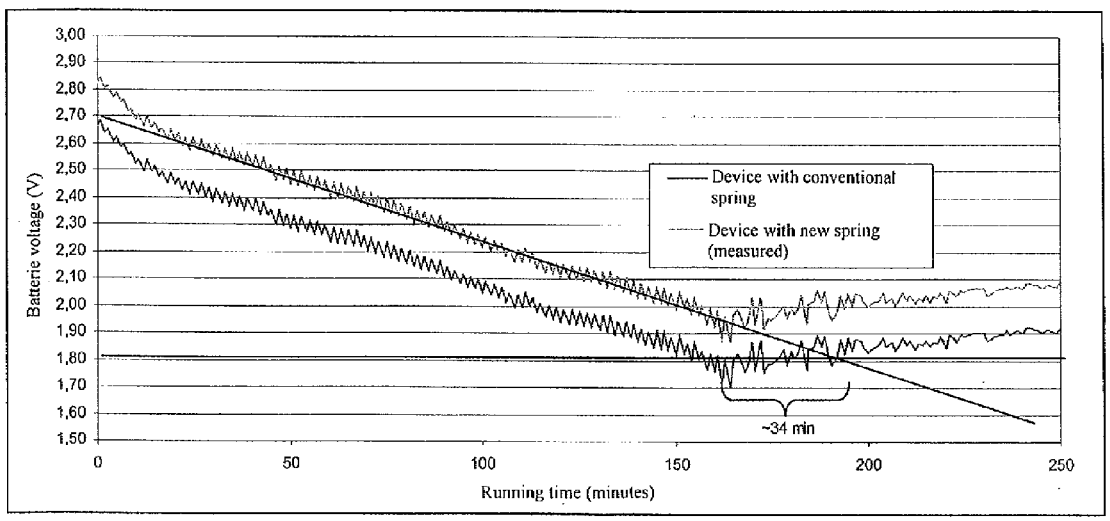
FIG. 2 is a schematic diagram demonstrating the operating performance of a battery contact spring according to one embodiment compared to a conventional battery contact spring.

FIG. 2 shows a time curve of the voltage tapped by means of the battery contact springs. In this connection, the top graph indicates the voltage available to the device when the battery contact spring described herein is used. The bottom graph indicates the voltage curve when a conventional battery contact spring is used. As is clear from this diagram, use of the battery contact springs made in accordance with the present disclosure, makes it possible to significantly extend the running time (in this instance: 34 minutes) of a battery-operated small device.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A battery contact spring with a spring body manufactured as a flexible wire part comprising:
   a first contact head section for contacting a first battery;
   a second contact head section for contacting a second battery, and
   at least one first spiral spring section that extends between a spring foot area and the first contact head section and which flexibly supports the first contact head section,
   wherein the spring body is designed in such a way that a coil end of the first spiral spring section opposite the spring foot area crosses over into the first contact head section and attached to this first head section is a connection bridge that crosses over into the second contact head section.

2. The battery contact spring according to claim 1, wherein the second contact head section is supported by a second spiral spring section.

3. The battery contact spring according to claim 1, wherein the connection bridge is carried out as an essentially straight wire bridge.

4. The battery contact spring according to claim 1, wherein the first contact head section is carried out as a convex bow section bulging out away from the first spiral spring section.

5. The battery contact spring according to claim 2, wherein the second contact head section is carried out as a convex bow section bulging out away from the second spiral spring section.

6. The battery contact spring according to claim 1, wherein the first spiral spring section is carried out as a conical spiral spring coil that extends up to the spring foot area.

7. The battery contact spring according to claim 1, wherein the first spiral spring section has three, four or five spring coils.

8. The battery contact spring according to claim 2, wherein an additional connection bridge is provided for connecting the coil ends of the first and second spiral spring sections electrically in the spring foot area.

9. The battery contact spring according to claim 1, wherein the coil end is bent into an anchoring structure in the spring foot area.

10. A battery contact spring with a spring body manufactured as a flexible wire part comprising:
    a first contact head section for contacting a first battery;
    a second contact head section for contacting a second battery;
    a first spiral section that extends between a spring foot area and the first contact head section and which flexibly supports the first contact head section; and
    a second spiral spring section that extends between a spring foot area and the second contact head section and which flexibly supports the second contact head section;
    wherein the first spiral spring section and the second spiral spring section are connected by means of a connection bridge attached to the first head section and the second head section.

11. A battery-operated small device, having a battery contact spring according to claim 1.

* * * * *